May 31, 1949. E. W. HALBACH 2,471,683
MULTIPLE NOZZLE MECHANISM FOR
INJECTION MOLDING MACHINES
Filed Sept. 6, 1945

INVENTOR.
Ernest W. Halbach
BY
Heard Smith & Tennant
Atty's.

Patented May 31, 1949

2,471,683

UNITED STATES PATENT OFFICE 2,471,683

MULTIPLE NOZZLE MECHANISM FOR INJECTION MOLDING MACHINES

Ernest W. Halbach, Andover, Mass., assignor to The Bolta Company, Lawrence, Mass., a corporation of Massachusetts Application September 6, 1945, Serial No. 614,677

6 Claims. (Cl. 18—30)

1

This invention relates to improvements in moulding mechanism for injection moulding machines having a single source for supplying molten material to the mould, and the general object of the invention is to provide means for delivering the mouldable material to the mould in such manner as to increase the rapidity of production of the moulded articles and to insure greater uniformity of the moulded product.

More specifically the invention comprises the provision of means for supplying the molten material under pressure from a single source to the mould cavity at a plurality of spaced intervals, thereby to enable the mould more quickly to be filled, thus increasing the output of the machine, and also insuring complete and uniform filling of the mould cavity and consequent uniformity of the product.

Another object of the invention is to provide a construction comprising a conduit, leading from a source for supplying molten material under pressure, having branches provided with nozzles communicating with widely separated sprue holes leading to the cavity of the mould in which the nozzles are adapted to continuously engage flat surfaces upon the outer faces of the mould and are adapted to be moved in such manner that the ports of the nozzle may be placed into or out of registry with the sprue holes leading to the mould, thereby to cut off the supply of molten material when the cavities of the mould are filled and avoiding wastage of the molten material.

A further object of the invention is to provide means for heating the material in the branches of the conduit in such manner as to maintain proper fluidity of the molten material during the time that the ports of the nozzle are not in registry with the sprue holes of the mould, thus insuring proper filling of the mould when the ports of the nozzles are moved into registry with the sprue holes.

Another object of the invention is to provide mechanism by which the nozzles are moved into and out of registry with the sprue holes in synchronism with the operation of the mechanism for controlling the supply of molten material to the conduit.

A further object of the invention is to provide the sprue holes leading to the conduit with bushings having enlarged heads with flat finished faces continuously engaged by the movable nozzles, thereby to prevent any wastage of material when the nozzles are moved out of registry with the sprue holes of the mould.

These and other objects and features of the

2 invention will more fully appear from the following description and the accompanying drawings and will be particularly pointed out in the claims.

Figure 1:
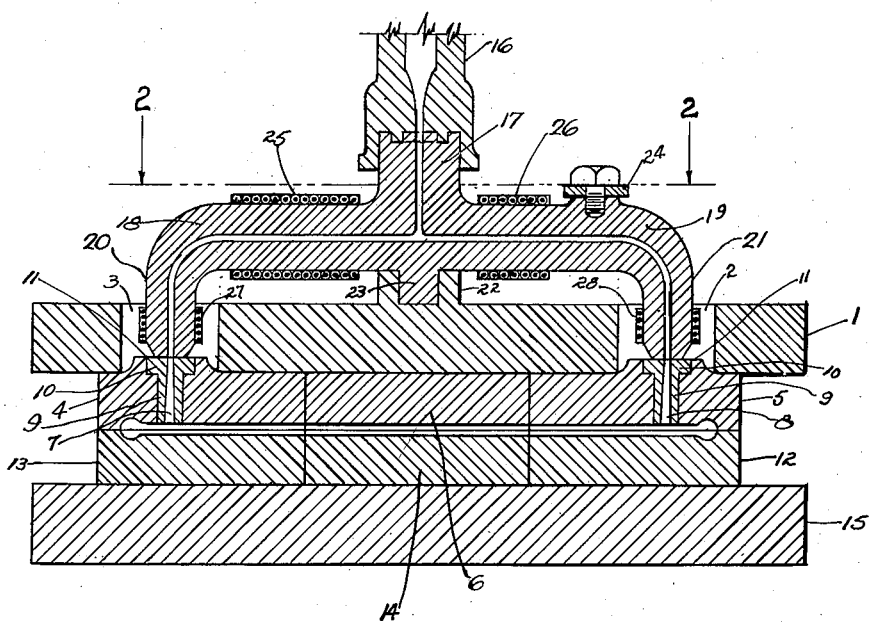
Fig. 1 is a vertical sectional view of moulding mechanism adapted to embodied in a usual form of injection moulding machine having a single source for supplying molten material and which is provided with a plurality of nozzles leading from said conduit to deliver the molten material to the cavity of the mould at suitably spaced intervals.
Figure 2:
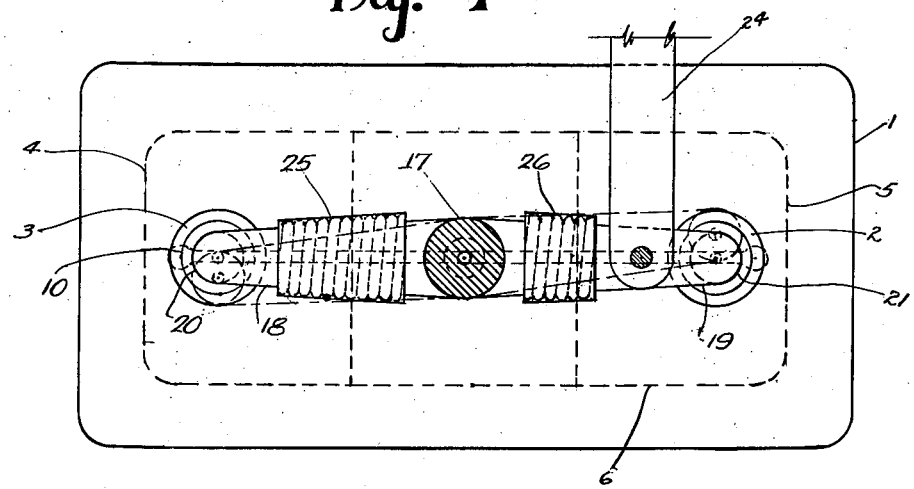
Fig. 2 is a horizontal sectional view on line 2—2 Fig. 1, viewed downwardly.

In usual injection moulding machines for casting long articles of small cross sectional area, such for example as machines for moulding thin longsleeves used for spacing sleeves in precision instruments, the material which is delivered through a single sprue hole to the cavity of the die is required to travel such considerable distance that by reason of loss of heat through absorption by the mould the fluidity of the molten material is substantially reduced and in many instances results in imperfect moulding of the articles.

One of the objects of the invention is, as above stated, to provide means for simultaneously injecting the molten material under pressure into the mould at suitably spaced intervals which not only will fill the mould more rapidly, but which will prevent substantial reduction in the fluidity thereof.

The construction illustrated in the accompanying drawings comprises a fixed die plate 1 adapted to be secured to the frame of a usual injection moulding machine having a single source for supplying molten material under pressure. The die plate 1 is provided with a plurality of suitably spaced nozzle-receiving apertures 2 and 3. A suitable mould member which as illustrated herein comprises outer mould sections 4 and 5 and one or more intermediate mould sections 6 is detachably secured to the die plate 1. Certain of these sections, preferably the end sections 4 and 5, are provided with sprue holes 7 and 8 each of which has a bushing 9 having an enlarged head 10 provided with a finished flat face 11. The complementary mould member which is illustrated herein comprises end sections 12 and 13 and one or more intermediate sections 14 is secured to the usual movable die plate 15 which is actuated by the usual preferably hydraulic mechanism of the die-casting machine.

The means for supplying molten material under pressure comprises a conduit 16 leading from a single source for supplying molten material under pressure and has pivotally connected or swiveled to it a head 17 having laterally extending branches 18 and 19 provided with integral nozzles 20 and 21 extending at right angles thereto through the apertures 2 and 3 in the die plate 1 into engagement with the flat surfaces of the heads 10 of the sprue hole bushings 9. The nozzles 20 and 21, which extend through the apertures 2 and 3, are of less diameter than the width of the apertures 2 and 3 which, as shown herein, are of circular form. The ports of the nozzles are adapted to register with the passages through the sprue hole bushings, but are adapted to be moved out of registry therewith when the mould has been filled. Any suitable means may be provided for accomplishing this purpose. A convenient means which is illustrated in the accompanying drawings comprises a pivotal connection between the head and the fixed die plate 1 located centrally between the apertures 2 and 3. In the construction illustrated such pivotal connection comprises a boss 22 integral with and extending outwardly from the outer face of the die plate 1 provided with a cylindrical socket and the head 17 has an integral boss 23 which rotatably fits within the socket of the boss 22.

By reason of this construction the head may be rotated manually or otherwise to bring the ports of the nozzle into registry with the sprue holes to permit simultaneous filling of the mould from both ends or upon filling of the mould to rotate it out of registry thereby retaining the material in the branches without wastage during the separation of the mould and the removal of the article or articles therefrom.

Preferably suitable means are provided for moving the nozzles into and out of registry with the mould in correlation to the usual mechanism for controlling the supply of molten material under pressure through the conduit 16. As illustrated herein a link 24, which is pivotally connected at one end to one of the conduit branches, is connected at its other end to the usual controlling mechanism, and is operable to move the respective nozzles into and out of registry with the sprue holes as will be readily understood by those skilled in the art.

Suitable means are provided for maintaining the molten material in the branches of the head in a proper condition of fluidity. As illustrated herein electric heating coils 25 and 26 surround the arms 18 and 19 and similar electric heating coils 27 and 28 surround the nozzles in proximity to their ports.

By reason of the present invention long moulded articles of small cross sectional area can be produced at a maximum rate for as soon as the moulded article has been removed from the moulds and the moulds closed the mould can be immediately charged again with material at the proper fluidity by moving the nozzles into registry with the sprue holes so that the fluid pressure will quickly and completely fill the moulds without any substantial reduction in its degree of fluidity and when the mould is filled passage to the mould will be cut off without any loss or wastage of material.

It will be understood that the stationary and movable die plates 1 and 15 with the moulds carried thereby may be arranged either horizontally or vertically in accordance with the construction of the die-casting machine to which they are applied.

It will be understood that the particular embodiment of the invention shown and described herein is of an illustrative character and not restrictive of the meaning and scope of the following claims.

Having thus described the invention, what is claimed as new, and desired to be secured by Letters Patent, is:

1. Moulding mechanism for injection moulding machines comprising a stationary die-supporting plate having symmetrically spaced nozzle-receiving apertures equally spaced from a center thereof, a plurality of mould sections secured to said die-supporting plate having raised flat surfaces registering with said apertures and having cavities and provided with sprue holes extending centrally from said flat surfaces communicating with the respective cavities, a complementary relatively movable die-supporting member having a plurality of mould sections provided with cavities complementary to the cavities of said stationary mould sections, means for simultaneously conducting molten material to said mould cavities comprising a hub pivotally mounted on said stationary die-supporting plate at said center having an axial conduit therein and integral radial branches having conduits therein extending from said hub and provided with curved end portions forming nozzles passing through the apertures in said die-supporting plate engaging the flat surfaces of the moulds and registering with the sprue holes therein, and means for rotating said hub and the branches thereof about the pivot sufficiently to position the nozzle out of registry with the respective sprue holes thereby to cut off the supply of material to said moulds without wastage and electric heating means surrounding the respective branches for maintaining the fluidity of the material therein when the nozzles are not in registry with the sprue holes.

2. Moulding mechanism for injection moulding machines as defined in claim 1, in which the sprue holes are provided with bushings having enlarged heads countersunk in said flat faces and carefully surfaced to engage complementary surfaces in the ends of the respective nozzles.

3. Moulding mechanism for injection moulding machines for casting long thin articles comprising a stationary die-supporting plate having widely spaced nozzle-receiving apertures, a plurality of alined mould sections secured to said die-supporting plate having raised flat surfaced areas registering with the respective nozzle-receiving apertures and provided with longitudinally communicating cavities with sprue holes extending from the respective end portions of said cavities through said flat areas, a complementary relatively movable die-supporting member having a plurality of mould sections provided with alined cavities complementary to those of said stationary mould sections, means for simultaneously conducting molten material to the end portions of said mould cavities comprising a nozzle member having a hub pivotally mounted on said stationary die-supporting plate centrally of the distance between the apertures therein and having cylindrical branches extending in radially opposite directions provided with curved end portions forming nozzles extending through the respective apertures in the die plate engaging the flat surfaces of said moulds and registering with the sprue holes of said moulds, and means for rotating the nozzle member about its pivot sufficiently to position the nozzles out of registry with the sprue holes thereby to cut off the supply of molten material to the moulds when the latter are filled and prevent wastage of material.

4. Moulding mechanism for injection moulding machines for casting long thin articles as defined in claim 3, in which each of said branches is surrounded by an electric heating coil to maintain fluidity of the material therein when the nozzle is out of registry with the sprue hole in the die.

5. Moulding mechanism for injection moulding machines for casting long thin articles as defined in claim 4, in which each of the cylindrical branches is surrounded by an electric heating coil adjacent the hub and the nozzle is also surrounded by an electric heating coil thereby to maintain fluidity of the material in each branch while out of registry with the sprue hole in the die.

6. Moulding mechanism for injection moulding machines for casting long thin articles as defined in claim 3, in which each of said nozzles is provided with an accurate flat surface and in which the sprue holes of each of said moulds is provided with a bushing having an enlarged head countersunk in the mould and provided with an accurate flat surface complementary to that of the nozzle end.

ERNEST W. HALBACH.

REFERENCES CITED

The following references are of record in the file of this patent:

UNITED STATES PATENTS

| Number | Name | Date |
|---|---|---|
| 2,193,935 | Mulcahy | Mar. 19, 1940 |
| 2,227,263 | Knowles | Dec. 31, 1940 |
| 2,239,338 | Norelli | Apr. 22, 1941 |
| 2,274,800 | Lester | Mar. 3, 1942 |